(12) United States Patent
Chiu et al.

(10) Patent No.: US 12,073,520 B2
(45) Date of Patent: Aug. 27, 2024

(54) AUGMENTED REALITY IMPLEMENTING METHOD FOR GENERATING AUGUMENTED REALITY CONTENT

(71) Applicant: ASUSTEK COMPUTER INC., Taipei (TW)

(72) Inventors: Kuo-Chung Chiu, Taipei (TW); Hsuan-Wu Wei, Taipei (TW); Yen-Ting Liu, Taipei (TW); Shang-Chih Liang, Taipei (TW); Shih-Hua Ma, Taipei (TW); Yi-Hsuan Tsai, Taipei (TW); Jun-Ting Chen, Taipei (TW); Kuan-Ling Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 108 days.

(21) Appl. No.: 17/959,832

(22) Filed: Oct. 4, 2022

(65) Prior Publication Data

US 2023/0326146 A1 Oct. 12, 2023

(30) Foreign Application Priority Data

Apr. 7, 2022 (TW) .................................. 111113153

(51) Int. Cl.
*G06T 19/00* (2011.01)
*G06K 7/14* (2006.01)
(Continued)

(52) U.S. Cl.
CPC .......... *G06T 19/006* (2013.01); *G06K 7/1417* (2013.01); *G06T 7/60* (2013.01); *G06T 19/20* (2013.01)

(58) Field of Classification Search
CPC ....... G06T 19/006; G06T 19/20; G06T 17/60; G06K 7/1417
See application file for complete search history.

(56) References Cited

U.S. PATENT DOCUMENTS 6,567,104 B1 * 5/2003 Andrew .................. G06F 9/451
715/764
9,753,687 B1 * 9/2017 Cronin .................. G02B 27/017
(Continued)

FOREIGN PATENT DOCUMENTS

CN 104508697 A 4/2015
CN 108536734 A 9/2018
(Continued)

*Primary Examiner* — King Y Poon
*Assistant Examiner* — Vincent Peren
(74) *Attorney, Agent, or Firm* — MUNCY, GEISSLER, OLDS & LOWE, PC (57) ABSTRACT

An augmented reality implementing method applied to a server, which includes a plurality of augmented reality objects and a plurality of setting records corresponding to the augmented reality objects respectively is provided. Firstly, the server receives an augmented reality request from a mobile device, where the augmented reality request is related to a target device. Then, the server is communicated with the target device to access current information. Then, the server determines the current information corresponds to which one of the setting records, and selects one of the augmented reality objects based on the determined setting record as a virtual object provided to the mobile device.

11 Claims, 5 Drawing Sheets

(51) Int. Cl.
*G06T 7/60* (2017.01)
*G06T 19/20* (2011.01)

(56) References Cited

U.S. PATENT DOCUMENTS

| | | | | |
|---|---|---|---|---|
| 2013/0069985 A1* | 3/2013 | Wong | ............... | G06F 3/14 345/633 |
| 2013/0278635 A1* | 10/2013 | Maggiore | ............ | G06F 3/0304 345/633 |
| 2015/0347114 A1* | 12/2015 | Yoon | ............... | H04L 12/2832 717/176 |
| 2016/0035246 A1* | 2/2016 | Curtis | ............... | H04L 67/10 340/815.4 |
| 2016/0295619 A1* | 10/2016 | Koroku | ............... | G06K 7/1447 |
| 2017/0322691 A1* | 11/2017 | Tokuchi | ............ | H04N 1/32122 |
| 2018/0077200 A1* | 3/2018 | Apvrille | ............ | H04L 63/1416 |
| 2021/0083992 A1* | 3/2021 | Didear | ............... | H04L 45/64 |

FOREIGN PATENT DOCUMENTS

| | | |
|---|---|---|
| CN | 110858376 A | 3/2020 |
| CN | 106030687 B | 8/2020 |

\* cited by examiner

FIG. 5

AUGMENTED REALITY IMPLEMENTING METHOD FOR GENERATING AUGUMENTED REALITY CONTENT

CROSS-REFERENCE TO RELATED APPLICATION

This application claims the priority benefit of Taiwan application serial No. 111113153, filed on Apr. 7, 2022. The entirety of the above-mentioned patent application is hereby incorporated by reference herein and made a part of the specification.

BACKGROUND OF THE INVENTION

Field of the Invention

This application relates to the field of Augmented Reality (AR) technologies, and in particular, to an augmented reality implementing method.

Description of the Related Art

With the increasing popularity of laptop computers, when buying laptop computers, users not only pay attention to their practical functions, but also want the appearance of the laptop computers to showcase their personal style. In order to highlight a personal style, current common methods include printing a special pattern on the housing of a laptop computer, using a protective case with a special pattern, or attaching a laptop sticker. However, although these methods can add special patterns to the portable computers, the users can only select a representative pattern at a time, which cannot be changed at will.

BRIEF SUMMARY OF THE INVENTION

This application provides an augmented reality implementing method, which is applied to a server, and the server includes a plurality of augmented reality objects and a plurality of setting records corresponding to the augmented reality objects respectively. The augmented reality implementing method includes: receiving, by a server, an augmented reality request from a mobile device, where the augmented reality request is related to a target device; communicating, by the server, with the target device to access current information of the target device; and determining, by the server, the current information corresponds to which one of the setting records, and selecting one of the augmented reality objects based on the determined setting record as a virtual object provided to the mobile device.

In the augmented reality implementing method provided in this application, the virtual object is related to the target device, so as to generate augmented reality content presented to the mobile device. In this way, the virtual object is presented on the target device to highlight a personal style of a user of the target device. The user of the target device can also change the related virtual object at will to reflect personalized characteristics according to the needs of the user.

DETAILED DESCRIPTION OF THE EMBODIMENTS

Figure 1:
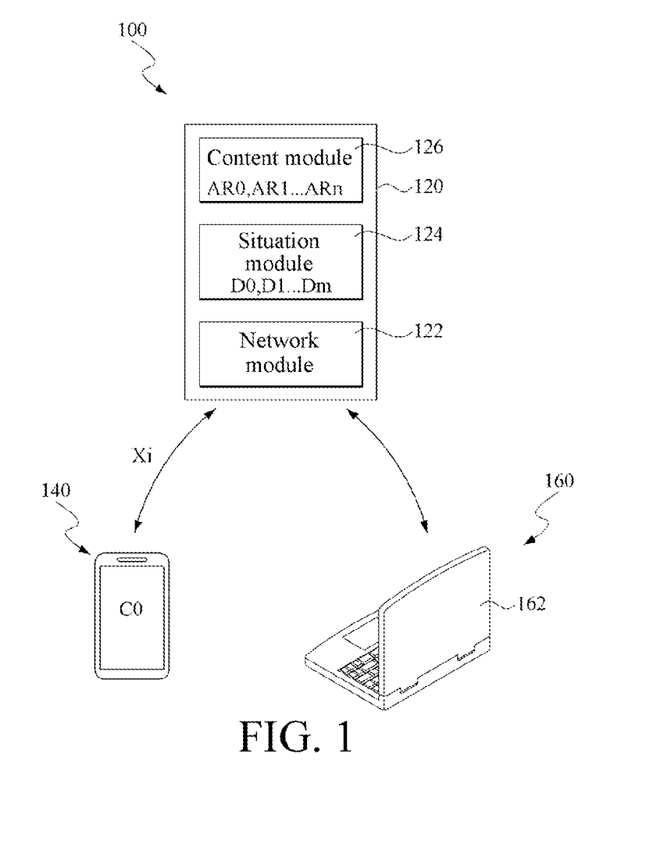
FIG. 1 is a schematic diagram of an augmented reality system provided according to an embodiment of this application.

Referring to FIG. 1, this application provides an augmented reality implementing method, which is implemented by an augmented reality system 100. The augmented reality system 100 includes a server 120, a mobile device 140, and a target device 160. The mobile device 140 is communicated with the server 120 to obtain a virtual object Xi related to the target device 160, so as to generate augmented reality content C0 presented to the mobile device 140. The target device 160 is communicated with the server 120 to set the situation of generating the virtual object Xi.

In an embodiment, the mobile device 140 is a smart phone, and the target device 160 is a laptop computer. The mobile device 140 may be any electronic device that includes a camera module to capture images and has network connectivity. The target device 160 may be any electronic device with network connectivity.

In an embodiment, the server 120 includes a network module 122, a situation module 124, and a content module 126. The network module 122 is configured to control a user. The user must log in to the server 120 through the network module 122 to execute a setting procedure. In this embodiment, the target device 160 can only be communicated with the situation module 124 to execute an augmented reality setting procedure after logging in to the server 120 through the network module 122. For detailed description of the augmented reality setting procedure, reference may be made to FIG. 2 and paragraphs corresponding to FIG. 2. Setting records D0, D1 . . . Dm generated by the augmented reality setting procedure are stored in the situation module 124.

The mobile device 140 is communicated with the situation module 124 to obtain the virtual object Xi to generate an augmented reality presented on the display of the mobile device 140 (not shown). For the detailed description of the process of generating the augmented reality, reference may be made to FIG. 3 and paragraphs corresponding to FIG. 3. The content module 126 is configured to store a plurality of different augmented reality objects AR0, AR1 ARn, which are related to the target device 160 as virtual objects Xi to present the augmented reality on the mobile device 140.

Figure 2:
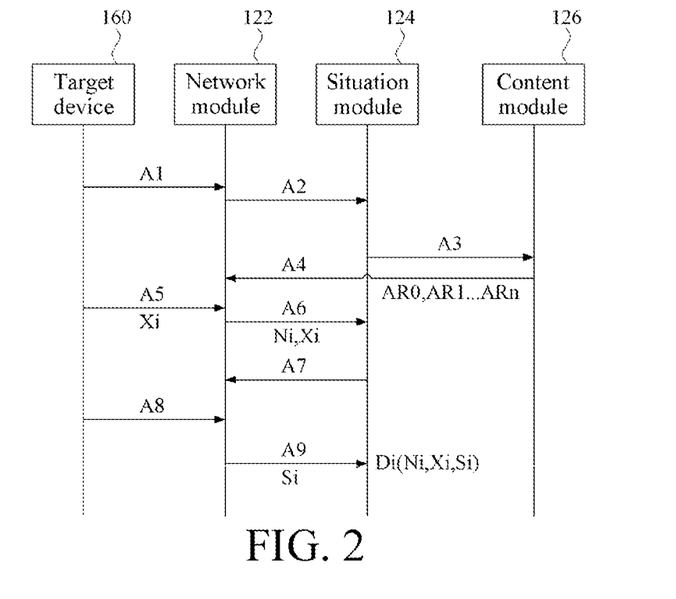
FIG. 2 shows an embodiment of an augmented reality setting procedure of the augmented reality system of FIG. 1.

FIG. 2 shows an embodiment of the augmented reality system 100 of FIG. 1, which performs the augmented reality setting procedure. The augmented reality setting procedure is mainly performed by the target device 160 and the server 120.

As shown in FIG. 2, firstly, as shown by an arrow A1, the user is communicated with the network module 122 of the server 120 through the target device 160 to perform login. Then, as shown by an arrow A2, the user notifies the situation module 124 to start the augmented reality setting.

Next, as shown by arrows A3 and A4, the situation module 124 notifies the content module 126 to send all available augmented reality objects AR0, AR1 ARn back to the network module 122 for selection by the user. Then, as shown by arrows A5 and A6, the user selects the virtual object Xi to be used in the augmented reality objects AR0, AR1 . . . ARn through the target device 160, and creates a corresponding situation number Ni in the situation module 124. Next, as shown by an arrow A7, the situation module 124 queries the situation corresponding to the virtual object Xi through the network module 122. Then, as shown by arrows A8 and A9, the user inputs the situation corresponding to the virtual object Xi into the network module 122 through the target device 160, and then the network module 122 generates situation data Si according to the situation and inputs the situation data Si to the situation module 124, so as to complete the augmented reality setting procedure.

It can be seen that a setting record Di input by the augmented reality setting procedure corresponds to a situation number Ni, and includes situation data Si and a corresponding virtual object Xi. The user may input multiple groups of setting records D0, D1 . . . Dm in the augmented reality setting procedure, which are corresponding to different scenarios.

In an embodiment, the situation data Si is a user state, time, or a location. Taking the user state as an example, a plurality of groups of setting records D0, D1 . . . Dm is input in the augmented reality setting procedure, which are corresponding to different augmented reality objects for different user states such as meeting, resting and the like. In this way, the server 120 selects the corresponding augmented reality object as the virtual object Xi to be related to the target device 160 according to the setting records and a current user state.

Taking time as an example, a plurality of groups of setting records D0, D1 . . . Dm is input to the augmented reality setting procedure to correspond different time periods such as morning, afternoon, and evening to different augmented reality objects. In this way, the server 120 selects the corresponding augmented reality object as the virtual object Xi to be related to the target device 160 according to the time period of current time.

Taking a location as an example, a plurality of groups of setting records D0, D1 . . . Dm is input to the augmented reality setting procedure to correspond workplace and home to different augmented reality objects. In this way, the server 120 selects the corresponding augmented reality object as the virtual object Xi to be related to the target device 160 according to a current location of the target device 160.

Figure 3:
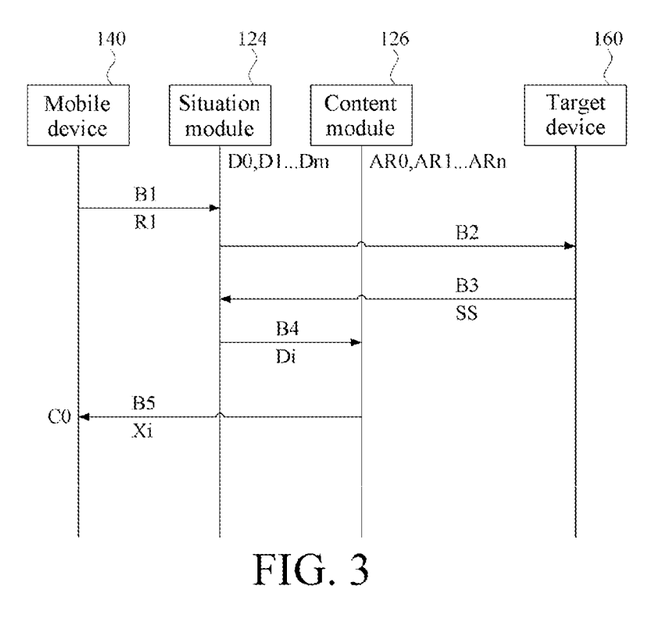
FIG. 3 shows an embodiment of the augmented reality system of FIG. 1 which generates augmented reality.

FIG. 3 shows an embodiment of the augmented reality system of FIG. 1, which generates augmented reality. The process of generating augmented reality involves the mobile device 140, the target device 160, and the server 120 working together.

As shown in FIG. 3, firstly, as shown by an arrow B1, the user uses the mobile device 140 to communicate with the situation module 124 of the server 120, and generates an augmented reality request R1 related to the target device 160. In an embodiment, the augmented reality request R1 may be a WEB AR request. In an embodiment, the mobile device 140 scans a barcode pattern, such as a two-dimensional barcode, to connect to a specific web address to generate the augmented reality request R1 related to the target device 160. The barcode pattern is arranged on the target device 160 by printing or in the form of a sticker. In an embodiment, the barcode pattern is arranged at a location where an augmented reality is expected to be generated, such as the housing 162 of the target device 160.

Next, as shown by arrows B2 and B3, the situation module 124 communicates with the target device 160 to obtain current information SS of the target device 160, such as a user state, a current time period, or a location of the target device 160 and the like. Then, the target device 160 sends the current information SS back to the situation module 124 so that the situation module 124 can select the virtual object to be used accordingly.

Then, as shown by arrows B4 and B5, the situation module 124 determines the setting record corresponding to the current data SS among a plurality of setting records D0, D1 . . . Dm (assuming the setting record is a setting record Di), to select the virtual object Xi to be used, and notifies the content module 126 to transfer the virtual object Xi to the mobile device 140.

After receiving the virtual object Xi, the mobile device 140 relates the virtual object Xi to an image of the target device 160 to produce augmented reality content C0 presented on the display of the mobile device 140. In this way, the related virtual object Xi is presented on the target device 160 as seen by the user through the display of the mobile device 140.

In an embodiment, the mobile device 140 overlays the virtual object Xi on the housing 162 of the target device 160 (which is a laptop computer in an embodiment), so that the housing 162 of the target device 160 presents an augmented reality object (that is, the virtual object Xi). In this way, a pattern of the virtual object Xi is presented on the housing 162 of the target device 160 as seen by the user through the display of the mobile device 140.

In an embodiment, the target device 160 is an electronic device having the housing 162, and the virtual object Xi is a pattern corresponding to the shape of the housing 162. The dimensions of the pattern are greater than or equal to the dimensions of the housing 162 presented on a display of the mobile device 140. The pattern is a 2D pattern or a 3D pattern. In an embodiment, if the target device 160 is a laptop computer, the virtual object Xi is a flat pattern completely covering the housing 162 of the laptop computer, or a three-dimensional pattern extending outward from the housing 162 of the laptop computer.

In an embodiment, the mobile device 140 determines the location of the target device 160 according to the outline of the housing 162 of the target device 160 and the two-dimensional barcode on the housing 162, and overlay the virtual object Xi on the housing 162 of the target device 160 so that the virtual object Xi moves on the screen of the mobile device 140 along with the target device 160. When the target device 160 leaves the screen of the mobile device 140, the virtual object Xi will disappear along with the target device 160.

In an embodiment, the user further clicks on the virtual object Xi on the mobile device 140 to perform further functions or create interactive effects with the virtual object Xi. In an embodiment, the user changes a color or appearance of the virtual object Xi by clicking on the virtual object Xi, or a description of the virtual object Xi will be shown on the screen when the user clicks on the virtual object Xi.

Through the augmented reality operation, from the view of the mobile device 140, the virtual object Xi appears to be attached to the housing 162 of the laptop computer, thereby changing the original appearance of the housing 162 of the laptop computer. In this way, through the augmented reality implementing method provided in this application, the housing 162 of the laptop computer may present various designs without actually replacing the housing 162 of the laptop computer or adding a decorative protective cover to the laptop computer.

In the foregoing embodiments of FIG. 2 and FIG. 3, the setting records D0, D1 . . . Dm are set by the user of the target device 160 and stored in the server 120 through the target device 160. In some other embodiments, the setting records D0, D1 . . . Dm can also be set by the user of the mobile device 140 and stored in the server through the mobile device 140. Also, in the foregoing embodiments of FIG. 2 and FIG. 3, the situation data of the setting records D0, D1 . . . Dm is related to the situation of the target device 160, such as the user state of the target device 160, the location of the target device 160 and the like. In some other embodiments, the situation data of the setting records D0, D1 . . . Dm can also be determined according to the situation of the mobile device 140. In an embodiment, the user state data stored in the mobile device 140 is used to determine the virtual object related to the target device 160.

Figure 4:
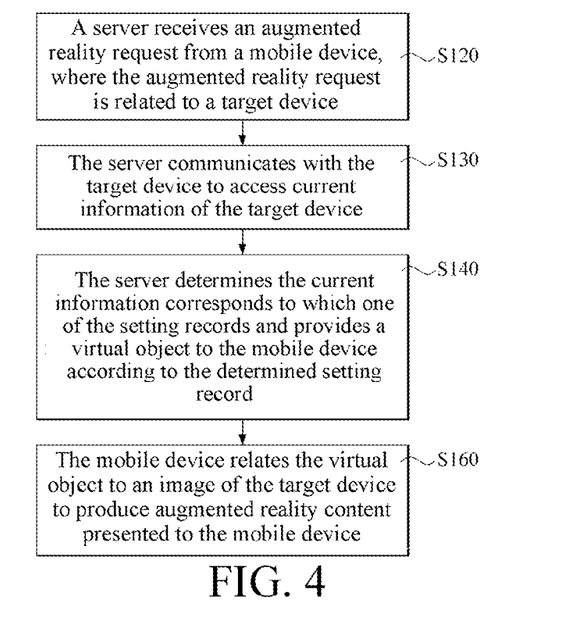
FIG. 4 is a flowchart of an augmented reality implementing method provided according to an embodiment of this application.

FIG. 4 is a flowchart of an augmented reality implementing method according to an embodiment of this application. The augmented reality implementing method is applied to the server 120 shown in FIG. 1. The server 120 pre-stores a plurality of different augmented reality objects AR0, AR1 . . . ARn and a plurality of setting records D0, D1 . . . Dm corresponding to the augmented reality objects AR0, AR1 . . . ARn. The augmented reality implementing method includes the following steps.

Firstly, as described in step S120, the server 120 receives an augmented reality request R1 from a mobile device 140, where the augmented reality request R1 is related to a target device 160.

Then, as described in step S130, the server 120 is communicated with the target device 160 to access current information SS of the target device 160.

Then, as described in step S140, the server 120 determines a setting record Di corresponding to the current information SS among the plurality of setting records D0, D1 . . . Dn, and provides a virtual object Xi to the mobile device 140 according to the determined setting record Di. In an embodiment, the server 120 selects one of the plurality of different augmented reality objects AR0, AR1 . . . ARn stored in the server 120 as the virtual object Xi according to the setting record Di.

The setting record Di includes situation data Si and a corresponding virtual object Xi. In an embodiment, the situation data Si is a user state, time, or a location.

After receiving the virtual object Xi, as described in step S160, the mobile device 140 relates the virtual object Xi to an image of the target device 160 to produce augmented reality content C0 presented to the mobile device 140. In an embodiment, the mobile device 140 directly presents the augmented reality content C0 by using a browser by using WEB AR.

Figure 5:
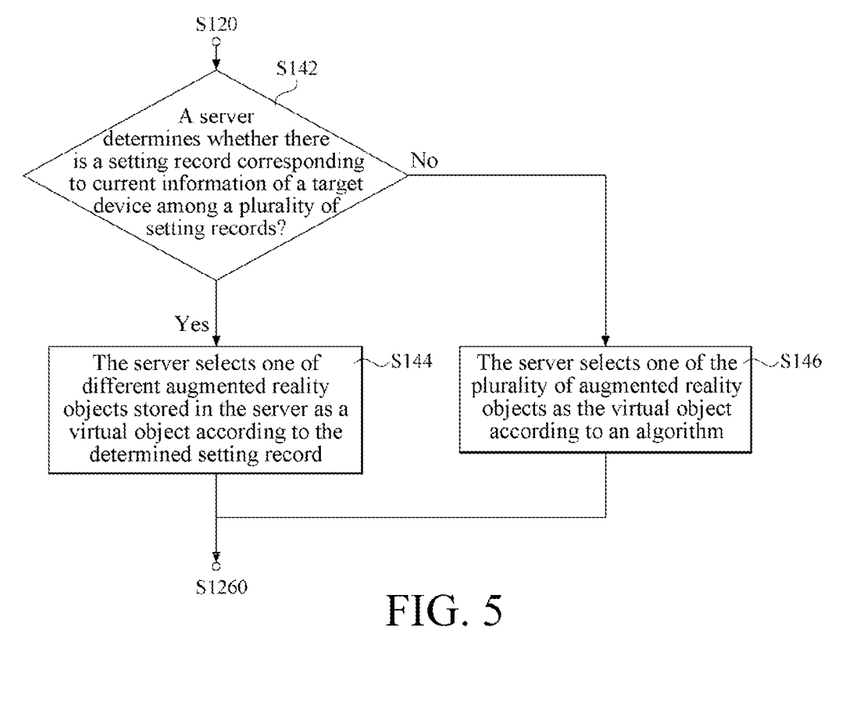
FIG. 5 is a flowchart of an embodiment of step S140 in FIG. 4.

FIG. 5 is a flowchart of an embodiment of step S140 in FIG. 4. Following step S120 in FIG. 4, in step S142, the server 120 determines whether there is a setting record corresponding to the current information SS of the target device 160 among the plurality of setting records D0, D1 . . . Dm.

If there is a setting record corresponding to the current information SS (assuming the setting record is a setting record Di), as described in step S144, the server 120 selects one of the plurality of different augmented reality objects AR0, AR1 . . . ARn stored in the server 120 as the virtual object Xi according to the determined setting record Di. If there is not a setting record corresponding to the current information SS, as described in step S146, the server 120 selects one of the plurality of augmented reality objects AR0, AR1 . . . ARn as the virtual object Xi according to an algorithm. In an embodiment, the algorithm is a random function.

Through the augmented reality implementing method provided in this application, virtual objects are related to the target device 160 to produce augmented reality content C0 presented to the mobile device 140. In this way, the virtual object Xi is presented on the target device 160 to highlight the specificity of the target device 160 and personal style of the user. The user of the target device 160 may also change the related virtual object at will to reflect personalized characteristics according to the needs of the user.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An augmented reality implementing method, applied to a server, wherein the server comprises a plurality of augmented reality objects and a plurality of setting records corresponding to the augmented reality objects respectively, the augmented reality implementing method comprising:
   receiving, by the server, an augmented reality request from a mobile device, wherein the augmented reality request is related to a target device;
   communicating, by the server, with the target device to access current information of the target device; and
   determining, by the server, the current information corresponds to which one of the setting records, and selecting one of the augmented reality objects based on the determined setting record as a virtual object provided to the mobile device,
   wherein the step of determining, by the server, the setting record corresponding to the current information among the plurality of setting records, and selecting one of the plurality of augmented reality objects based on the determined setting record as the virtual object provided to the mobile device comprises:
   determining, by the server, whether there is a setting record corresponding to the current information among the plurality of setting records; and
   if yes, selecting, by the server, one of the augmented reality objects as the virtual object based on the determined setting record, and if no, selecting, by the server, one of the augmented reality objects as the virtual object based on an algorithm.

2. The augmented reality implementing method according to claim 1, wherein the target device is an electronic device, and the electronic device comprises a housing.

3. The augmented reality implementing method according to claim 2, wherein the virtual object is a pattern corresponding to the shape of the housing.

4. The augmented reality implementing method according to claim 3, wherein dimensions of the pattern are greater than or equal to dimensions of the housing presented on a display of the mobile device.

5. The augmented reality implementing method according to claim 1, wherein the virtual object is a 2D pattern or a 3D pattern.

6. The augmented reality implementing method according to claim 1, wherein the algorithm is a random function.

7. The augmented reality implementing method according to claim 1, wherein the setting record comprises situation data.

8. The augmented reality implementing method according to claim 7, wherein the situation data comprises time.

9. The augmented reality implementing method according to claim 1, wherein the mobile device scans a barcode pattern to generate the augmented reality request.

10. The augmented reality implementing method according to claim 9, wherein the barcode pattern is arranged on a housing of the target device.

11. The augmented reality implementing method according to claim 10, wherein the barcode pattern is a two-dimensional barcode.

* * * * *